United States Patent [19]
Bodnar

[11] 3,940,775
[45] Feb. 24, 1976

[54] MULTIPLE EXPOSURE OPTICAL RECORDING METHOD AND APPARATUS

[76] Inventor: Jurij Bodnar, 41 E. Third Ave., San Mateo, Calif. 94401

[22] Filed: Apr. 8, 1974

[21] Appl. No.: 458,725

Related U.S. Application Data

[63] Continuation-in-part of Ser. No. 344,107, March 23, 1973, abandoned.

[52] U.S. Cl. ............................................. 354/122
[51] Int. Cl.² ....................................... G03B 1/00
[58] Field of Search .......................... 354/122, 125

[56] References Cited
UNITED STATES PATENTS

| | | | |
|---|---|---|---|
| 1,103,745 | 7/1914 | Farquhar | 354/125 |
| 1,510,410 | 9/1924 | Menyhart | 354/122 |
| 2,866,397 | 12/1958 | Gillette | 354/122 |

*Primary Examiner*—John M. Horan
*Attorney, Agent, or Firm*—Limbach, Limbach & Sutton

[57] ABSTRACT

A method of composing pictures of objects comprises the steps of exposing a frame of a record medium such as a frame of a roll of film or a target in a television camera via a camera lens while masking a portion of the field from exposure by a first mask disposed in front of the lens. The field frame of the record medium is then re-exposed via the same lens, while masking a previously unmasked portion of the field or frame and maintaining the f/stop for the lens the same as for the first exposure. The foregoing is accomplished by apparatus in one instance comprising a camera having means for transporting film, a lens, first and second masks serving to block light to complimentary portions of the film, a light shade supported by the lens to sequentially support the masks in front of the lens at a distance sufficient to inhibit exposure of complementary portions of the film. In another embodiment of the apparatus, a support holder having a plurality of masks is detachably securable to a light shade in front of the lens. The support holder is designed to selectively position each of its masks individually in front of the lens as desired.

7 Claims, 11 Drawing Figures

FIG_1

FIG_2

FIG_3

FIG_4

FIG_5

MULTIPLE EXPOSURE OPTICAL RECORDING METHOD AND APPARATUS

CROSS-REFERENCE TO RELATED APPLICATION

This application is a continuation-in-part of patent application Ser. No. 344,107 filed Mar. 23, 1973 for MULTIPLE EXPOSURE OPTICAL RECORDING METHOD AND APPARATUS, now abandoned.

BACKGROUND OF THE INVENTION

This invention pertains to a method for composing pictures employing a multiple exposure optical recording method, and apparatus particularly useful for carrying out such method in, for example, still photography, movies, projection, and photo processing, and also in television broadcasting.

It has long been desired to provide multiple optical images recorded on a single record medium, such as on a single film frame or screen. Ordinarily, however, special precautions and equipment are required in order to eliminate the distinguishable edges of the areas of each of the two images which are superimposed to make a single picture, and to prevent image overlap.

It has further long been desired to be able to achieve the foregoing with relative simplicity without involving special treatment, such as the implementation of air brushes and the like to paint out and retouch photographs, for example.

As disclosed herein, a method and apparatus have been provided whereby a photographer using relatively simple equipment can obtain successive exposure of adjacent areas on the same frame of a film or a television picture and leave virtually no evident line of demarcation between the areas of the images as recorded, notwithstanding differences in background of the images.

SUMMARY OF THE INVENTION

In general, the method of the invention relates to composite image photography and, more particularly, a method of controlling the formation of two or more images at different locations on the same film frame. The method includes the step of providing at least two photographic masks, each of which has two adjacent areas of differing light transmission qualities, e.g., an opaque region and a transparent or translucent region. The geometrical configuration of at least a portion of the boundary between the two areas on one of the masks is complementary to the geometrical configuration of a corresponding portion of the boundary between the two areas on the other of the masks. The complementary boundary portions will, therefore, represent the configuration of a demarcation between the two image exposures to be formed on the same film frame.

A first one of the masks is positioned in the optical path of the light entrance lens of a camera so that light from any subject to be photographed will pass through such mask prior to being received by the camera. Such positioning should be such as to also image the portion between the two areas of the mask on the film plane within the camera when the shutter is opened. The focusing (focusing distance) and the f/stop (focal ratio) of the lens are then adjusted to focus on the film plane, a first subject to be photographed through one of the areas of the first mask. Next the frame of film is exposed with the first mask in position as stated to obtain an image of both the subject through such area and the boundary portion on the first mask.

After the first exposure, the second mask is substituted for the first mask in the optical path of the lens at a position which will result in the boundary portion between the two areas thereon being imaged at generally the same location on the film frame as the image of the boundary portion of the first mask. Then the focus of the lens is adjusted to focus a second subject to be photographed through that area of the second mask on the opposite side of the complementary boundary portions as the area through which the first subject was photographed. It is important that the f/stop setting used with the second mask be maintained the same as it was for the first mask. The film frame is then again exposed to obtain an image of the second subject on the film frame along with the boundary portion.

It has been found that if the f/stop or, in other words, focal ratio of the lens is maintained the same for both exposures as aforesaid, there will be no overlapping of the images on the film frame. Although the optical phenomenon which is responsible for this clear demarcation between the two images when the focal ratio is maintained the same for both exposures is not completely understood, it is a phenomenon which has been empirically found to be quite important in the formation of aesthetically pleasing composite image photographs.

The invention also includes apparatus which is especially useful in practicing the method of the invention by providing in one compact unit a plurality of masks and enabling the substitution of one mask for another in front of the camera lens in a simple and expeditious manner. Such apparatus, however, is also advantageously useable to position other light modifying elements, such as filters and vignetters, before the lens of a camera. In its basic aspects, such apparatus includes a light shade, means for removably securing the light shade to the camera in front of the lens at a position which will result in all light received by the lens first passing through an entrance opening of the light shade, and a support holder for a plurality of the desired light modifying elements detachably secured to the light shade in front of the entrance opening. The support holder includes for each of the light modifying elements, a frame and means for pivotally securing the frame to the holder for movement between an inactive position in which it projects into the light shade adjacent one of its sides and out of the field of view of the lens and an active position within the holder in which it is in front of the light entrance opening of the light shade. As a particularly salient feature of the apparatus, all of the frames and light modifying elements associated with the support holder are also simultaneously positionable within the interior of the holder housing for protection whenever the holder is detached from the light shade.

A plurality of separate support holders can be provided, each of which includes different light modifying elements. Then, any selected one of the support holders can be individually secured to the light shade to provide a desired set of light modifying elements at any particular time. Because all the light modifying elements of each holder can be positioned within the holder housing when the holder is separated from the light shade, adequate protection for the light modifying elements associated therewith is provided so that the holder can be freely handled. As will be explained hereinafter, light shades of different depths may be desired under differing circumstances, and this arrangement of apparatus enables any combination of light shades with support holders to be provided.

DETAILED DESCRIPTION OF A PREFERRED EMBODIMENT

Using the photographic system 10 shown in FIG. 1 and described further below, the general method to which the invention relates for composing pictures on a record medium, such as a photographic film carried in a camera 11 and having a lens 12, proceeds along the steps of first exposing a frame of the film (or target of a television camera) via the lens 12 while masking a portion of the frame of film from exposure by a first mask assembly 13. Thus, if the frame of film were to be developed at this point, it would provide a frame such as shown at 14 in FIG. 3 wherein the subject has been recorded in one portion of the frame while another portion of the picture has been masked from exposure and, hence, remains unexposed.

Figure 4:
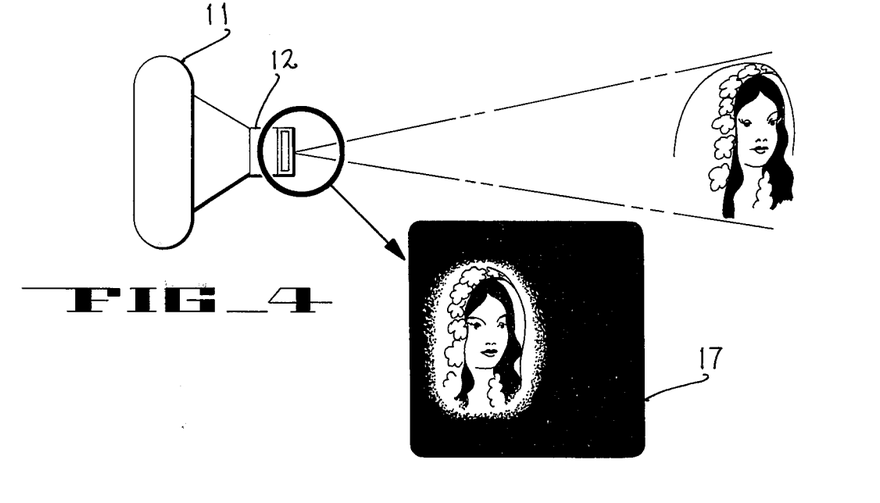

In composite image photography, however, the next step after forming the first exposure is to dispose another mask assembly 16 in front of the camera lens so that a close-up or different picture from a different view of another subject (or the same subject) can be taken and recorded on the same frame through a previously masked portion of the frame. If this step were executed solely by itself, it would provide a developed frame of the type shown in FIG. 4 at 17 with a protected, unexposed portion.

Figure 3:
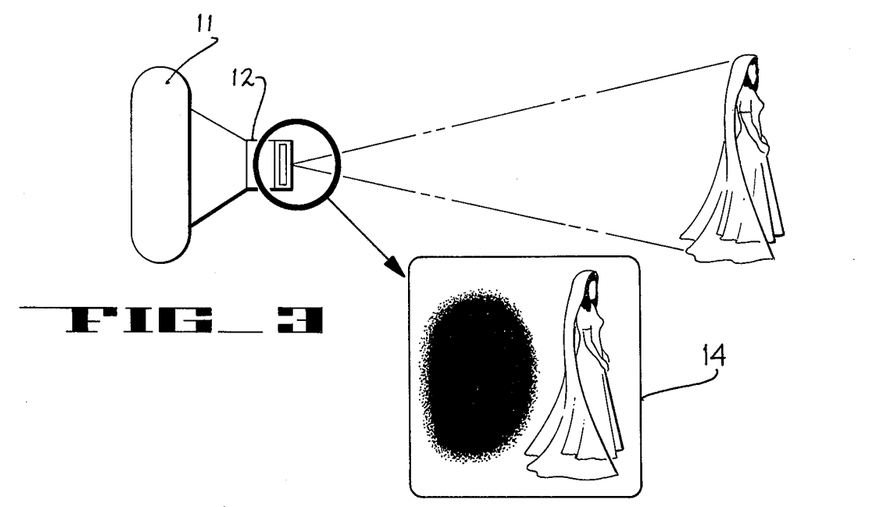
FIGS. 3 and 4 diagrammatically illustrate some of the general steps in carrying out the method of the invention.
Figure 5:
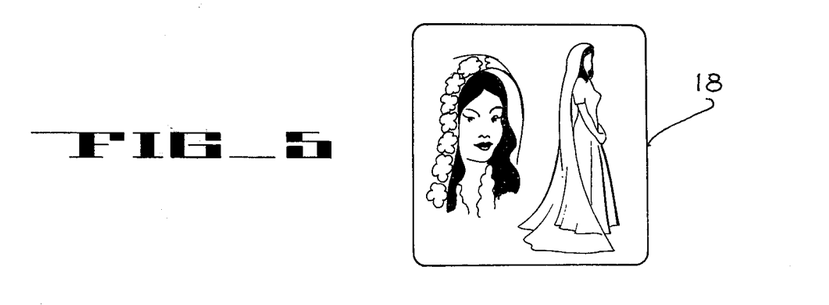
FIG. 5 shows a picture composed according to the method of the invention employing the view subjects of FIGS. 3 and 4.

By protecting a portion of the film frame from exposure as in FIG. 3 and reserving that portion for later exposure, the picture can be composed of a plurality of images as shown in FIG. 5 at 18.

It will be recognized that when each of the exposures discussed above is taken, following conventional practice it would be common to adjust the focusing, f/stop, and lens speed in order to achieve the optimum image on the film of each of the subjects. In the past, however, there has been difficulty in providing an appropriate demarcation between the two exposures on the film. In this connection, one of the more troublesome problems with composite image photography has been the overlapping at the boundary of the two images. As a particularly salient feature of the method, it has been found that if the f/stop setting for the lens is maintained the same for both exposures, (assuming that the same lens is being used for both exposures), no overlapping occurs. Thus, the method of the invention includes the step of providing for the second exposure in which the second mask is used the same focal ratio as used for the first exposure. The lens focusing and speed are then adjustable for each exposure independently of their setting for the other exposure. It is preferable, however, that in those cases in which it is desired that the demarcation be indistinguishable, that the amount of light received by the film in each exposure be generally the same. The result is that there will be substantially no contrast between the film exposure for each of the images. In order to provide such equal light exposure for both images, the speed of the lens, i.e., the amount of time that the lens is opened by the shutter to receive light, is adjustable. It must be remembered, though, that the focal ratio of the lens must be the same for both exposures so as to avoid overlap. Thus, if the same lens is used for both exposures, the f/stop setting for both exposures should be the same.

The above discussion with respect to maintaining the f/stop of the lens the same for both exposures applies in those cases in which the same lens is used for both exposures. There are some instances, however, when one lens is desired for a close-up view, and another for a more distant view. Typically, it has been observed that where an image taken with a telephoto lens is to be combined with an image taken through a standard lens, a difference in lens opening of a number of f/stops serves to provide optimum results in eliminating the demarcation between zones. As an example, a standard 80mm, f:2.8 lens and a telephoto 250mm, f:5.6 lens use a difference of substantially three f/stops, and these are respectively preferably f:8 and f:22.

The distance that each of the masks is disposed in front of the camera lens is also a variable which must be carefully considered in composite image photography. In this connection, each of the masks must be positioned such a distance in front of the lens that the frame or other structure which is supporting the same is not within the field of view of the lens. Also, because the boundary portion between the two areas of different light transmission qualities on the mask will be seen as an image on the film which is exposed, it is imperative that the magnification provided by the camera lens of the two complementary boundary portions of the two masks be such that the two images of the boundary portions formed by the two film exposures will be superimposed upon one another. If they are not, it will readily be appreciated that overlapping of the exposures at such boundary will occur. Such magnification is also controlled by the distances the masks are positioned in front of the lens. For simplicity, the location at which the masks are positioned in front of the lens is most desirably one providing a generally 1-to-1 magnification ratio between the area of the mask within the field of view of the lens and the area of the film frame exposable by such lens. Such positioning has the advantage of facilitating the composition of the photograph since the boundary between the two exposures on the film will correspond with the boundary visible in the view finder.

It should be noted that the method of the invention is not only applicable to composite image photography when the masks include an opaque and transparent area, but also when one of the masks includes a translucent area, such as is used in color vigneeting. Thus, for the purposes of the method of the invention it is only necessary that the two adjacent areas in each mask be of differing light transmission qualities, rather than necessarily opaque and transparent.

Having in mind the foregoing method, it will be readily appreciated that relatively precise registration between the regions of two successively employed masks is required in order to avoid the formation of a line of definition at the area of one or the other of the two masked portions. Accordingly, the apparatus shown in FIGS. 1 and 2 serves to provide substantially precise registration of any number of masks so as to avoid the problem of creating a demarcation line where a first mask and a second mask fail to precisely register. The precision required by the above circumstances is readily achieved by the utilization of glass or other optically ground, transparent panes as used herein whereby the masking portion thereof can be accurately disposed thereon.

Figures 1, 2:
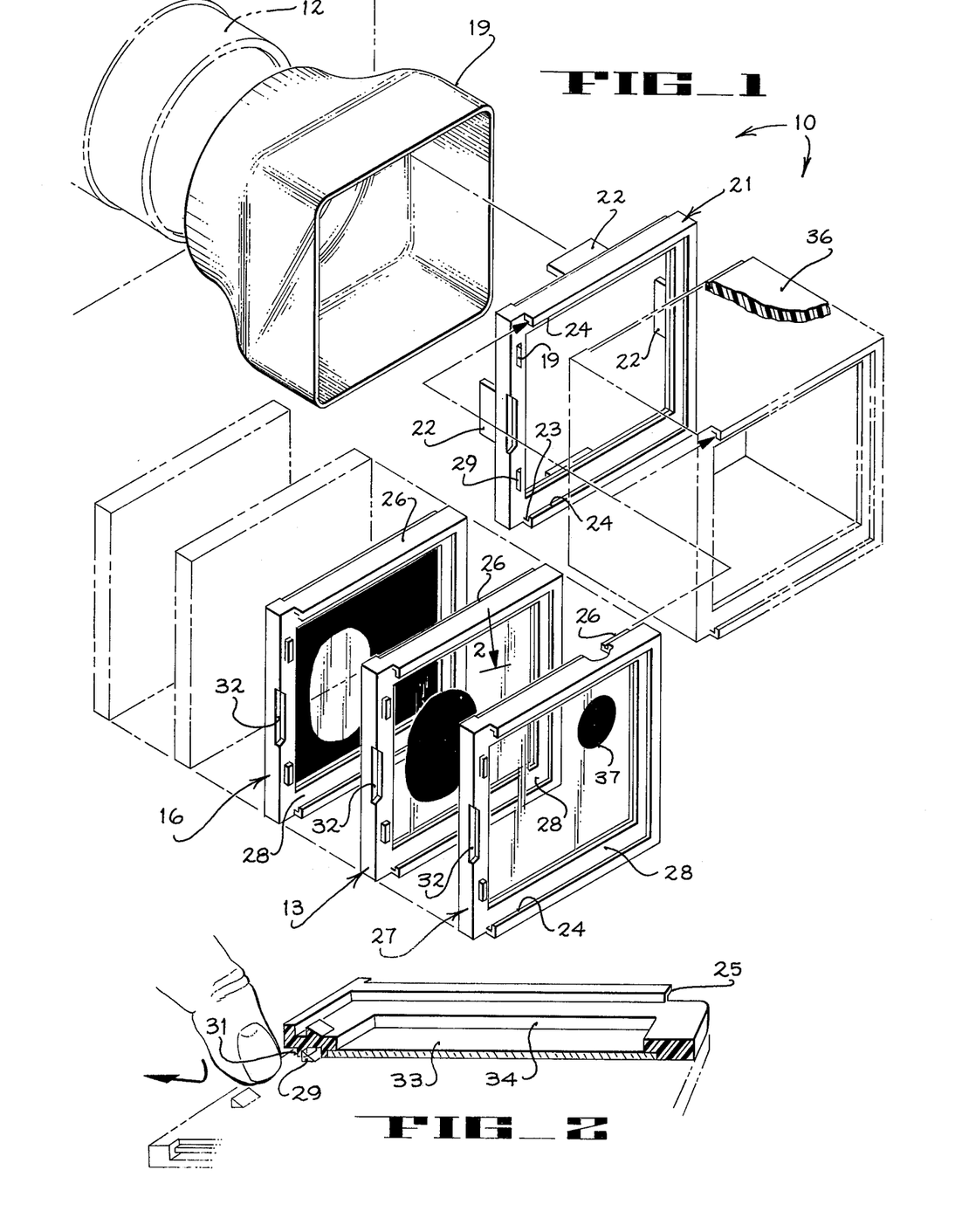
FIG. 1 shows a diagrammatic isometric exploded view with portions broken away of apparatus for composing pictures of multiple objects according to the method of the present invention.
FIG. 2 shows a side elevation of a mask assembly with portions broken away for clarity.

With reference to FIGS. 1 and 2, a support, such as a sun or other light shade 19, serves to dispose the masks at that distance in front of lens 12 maintaining substantially a one-to-one ratio between the size of the mask and the size of the overall area of the record medium to be recorded upon. Sun shade 19 includes a generally square configuration on one end and a cylindrical configuration on the other arranged to be secured to lens 12 by any suitable means well known to those in the art, such as by a bayonet connection or simply a press fit. Lens 12 for the moment will be deemed to be a standard focal length lens. Later, using extender 36 the same mask assemblies can be employed with a telephoto lens.

A supporting assembly 21 is readily secured to sun shade 19 by insertion of the four tangs 22 which snugly fit in a wedged relation within the opening of the square end of sun shade 19. Support assembly 21 includes on its forward face a pair of elongated retaining flanges forming slots 23 defined by lips 24 on opposite sides of the assembly frame folded over toward each other in confronting relationship. Oppositely facing lips 26 are carried on the backside of each mask assembly to be mounted on assembly 21. Thus, an upwardly facing lip 26 is shown on mask assembly 27 and is understood to be similarly disposed on the other mask assemblies 13 and 16 for forming with upper lips 24 a connection similar to that of a sliding tongue-and-groove connection. A similar downwardly directed elongated lip member 25 is carried along the bottom transverse member 28 of the assemblies 13, 16, 27 on the backside thereof (FIG. 2) so as to engage the upwardly extending lower lip 24.

It is readily evident that any one of mask assemblies 13, 16 or 27 is arranged to slide laterally into aligned position with regard to the optical axis of lens 12 simply by urging the assemblies 13, 16, 27 laterally while in engagement with the lip arrangement just described. A pane of glass 33 is cemented into the frame forming each assembly. Each pane includes portions which are transparent to light and portions which inhibit the transmission of light therethrough. Thus, the darkly shaded areas in FIG. 1 are intended to represent those portions which are essentially black or intended to inhibit light passing therethrough, typically totally.

In carrying out the method of the invention with this apparatus, mask assembly 13 would first be positioned onto support assembly 21 as noted above for the first exposure. It should be noted that cooperating means have been provided on both support assembly 21 and on the reverse side of each of the mask assemblies 13, 16, 27 for retaining a mask assembly from loosely sliding to the left as viewed in FIG. 1. Thus, the retaining nibs 29 serve to engage downwardly (FIG. 2) directed nibs of similar extent 31, and by simply inserting a fingernail into the slot 32 and gently pressing rearwardly, nibs 29 and 31 may be separated for sliding movement.

With the above construction, a number of mask assemblies can be cascaded together to form various patterns and designs as desired. Moreover, as is well known, use of complementary masks or other masks in positions adjacent the film but behind the lens serves to provide relatively sharp outlines of the areas controlled by the masks. However, in the present instance where the mask assemblies are disposed in front of the lens, this is not true.

In the event that lens 12 is a telephoto lens having a longer focal length and narrower lens angle, it is preferred to employ a mask extender unit 36 in front of the sun shade 19 to obtain the previously discussed one-to-one ratio. The extender is face constructed in the manner of the front and reas sides of each of the masks to include flange assemblies for interlocking sliding relationship. Unit 36 thereby serves to support the mask assemblies at an appropriate position from a telephoto lens whereby they can also be effective when used with a telephoto lens to maintain substantially a one-to-one ratio between the size of the mask and the size of the overall area of the record medium to be recorded upon. Thus, the same mask assemblies 13, 16, 27 are usable with both a standard lens and a telephoto lens.

It is preferable to form the mask assemblies of a size corresponding to the size of the frame of film or other record image. This simplifies the task of composing multi-image pictures. Moreover, this feature, along with the previously discussed location of the masks a distance in front of the lens providing substantially a one-to-one ratio between the size of the mask and the size of the overall area of the record medium to be recorded upon, assures that the images of the boundaries will be congruent with one another.

It should be observed that two or more mask assemblies can be readily combined such as 13 and 27 to provide a first exposure of the record material and then frame 16 can be employed to take a second exposure of the same film in the region protected by mask 13. Ultimately, a third exposure can be made in the small circular region 37 formed in the pane of glass in mask assembly 27.

FIGS. 6 through 10 illustrate an apparatus which is especially adapted for use in practicing the method of the invention. Such apparatus not only provides precise registration of masks in front of the camera lens as necessary for the method, but also carries a plurality of masks in a single unit so as to minimize the number of parts which must be kept together by a photographer in any particular situation. Such apparatus include an adapter plate 41 for detachably securing a light shade 42 in front of the camera lens. As shown, such adapter 41 includes a bayonet ring 43 of a conventional construction for securance to the camera, and a plate 44 having a peripheral construction to be described in more detail hereinafter which cooperates with a corresponding peripheral construction on the light shade 42 to detachably secure them together.

The adapter 41 is useful for securing structures other than the light shade 42 to the camera lens. In this connection, a frame 46 for a mask, filter, or other light modifying element is shown to exemplify such an alternate structure. The manner in which the frame 46 is securable to the adapter 41 is the same as the manner in which the light shade is so securable thereto.

The light shade 42 is generally of a square shape and has a light entrance opening 47 through which all light which is transmitted by the lens 12 into the camera first passes.

The apparatus also includes a support holder 48 which simultaneously holds a plurality of light-modifying element assemblies, e.g., frames 49 and 50. More particularly, the support holder 48 includes a housing 51 which has a square shape complementary to that of the light holder, and a frame 49 with a light modifying element is positioned therein parallel to one of its sides and projecting outward therefrom into the light shade 42 through its entrance opening 47. Thus, when the support holder 48 and the light shade 42 are secured together, they cooperate to house the four masks and their frames.

Figures 6, 7, 8:
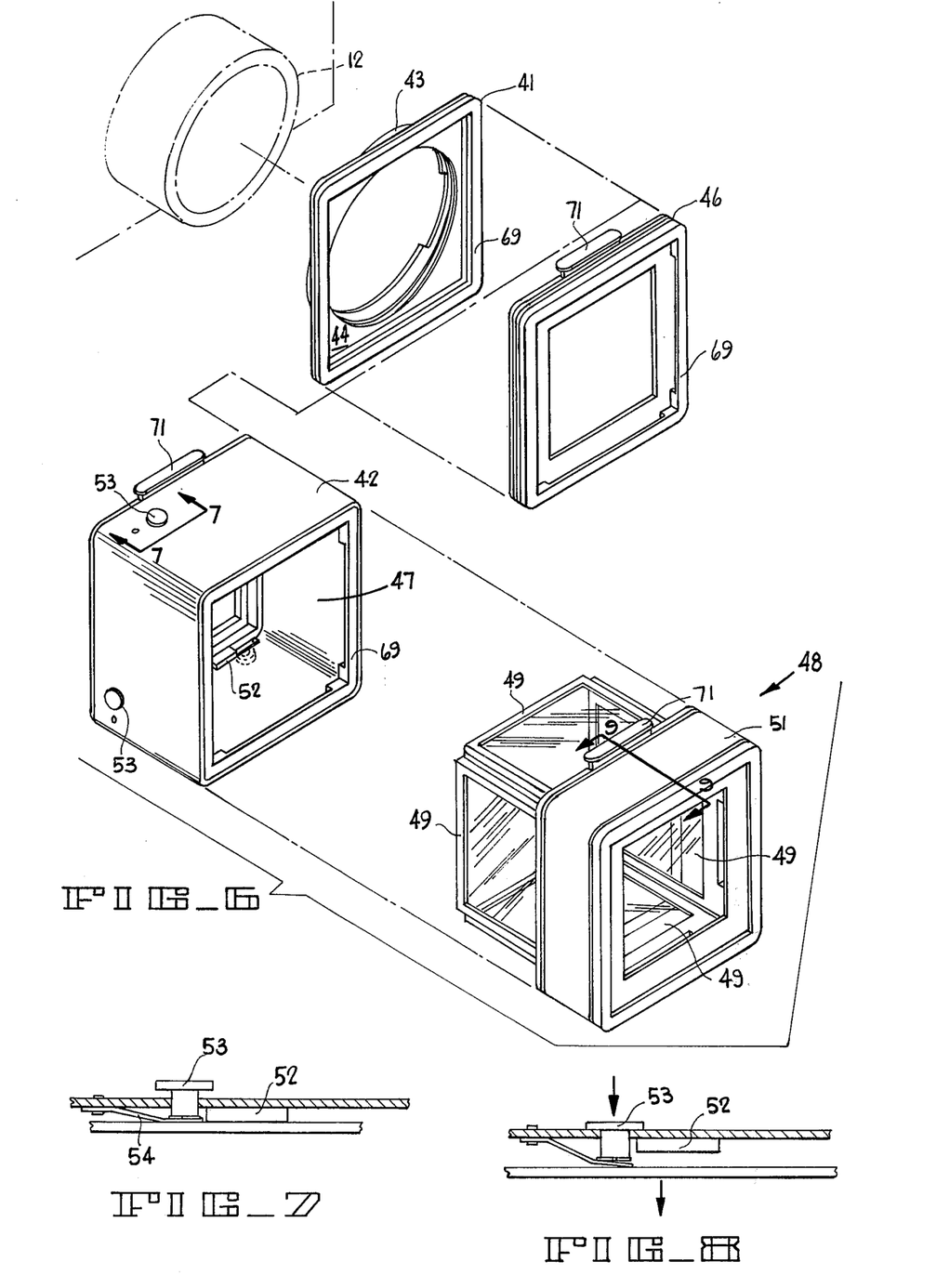
FIG. 6 is an isometric exploded view of a preferred embodiment of the apparatus of the invention.
FIGS. 7 and 8 are enlarged partial sectional views taken on the plane indicated by the lines 7—7 in FIG. 6 when the apparatus of the invention is assembled, illustrating the releasable mechanism for normally maintaining each of the masks in its inactive position.

The position in which each of the mask assemblies is shown in FIG. 6 is an inactive position. That is, when each of the masks is positioned as shown generally adjacent and parallel to the sidewalls of the support holder housing 51 and the light shade 42, it is out of the field of view of the lens so that it does not interfere with the passage of a full field of the subject to such lens.

Releasable means are associated with the light shade for securing each of the frames in its inactive positions. More particularly, as is best illustrated in FIGS. 7 and 8, a magnet 52 is secured to the interior side of each of the light shade walls at a location at which it will magnetically interact with the frame 49 of each of the mask assemblies. In this connection, the frames 49 are made of a metal for such interaction. It will be appreciated that this construction will result in each of the frames and its associated mask normally being maintained against its adjacent light shade side wall.

Associated with each of the magnetic structures is an actuator accessible from the exterior of the light shade enabling selective release of the individual frames. More particularly, a plunger 53 extends through each of the light shade side walls. Each of such plungers is urged to its undepressed position by a leaf spring 54. Such plunger is, however, so situated that upon being depressed from the exterior of the light shade, it will engage the mask frame adjacent the side wall and separate it from the magnet and, thereby, effect release of the frame.

Figure 9:
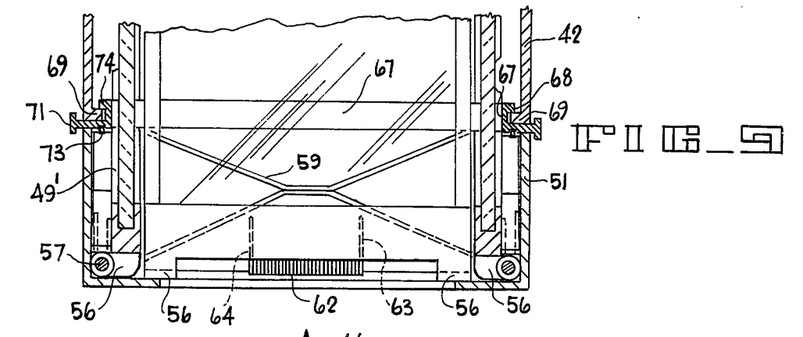
FIGS. 9 and 10 are enlarged partial sectional views taken on the plane indicated by the lines 9—9 in FIG. 6 illustrating details of the construction of the support holder.
Figure 10:
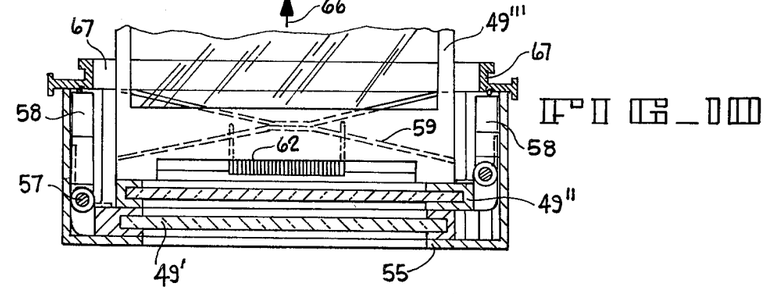

Each of the frames 49 is pivotably secured to the holder for movement between the inactive position illustrated in FIG. 6 and an active position within the holder in which it is in front of the entrance opening 47 so that the mask supported thereby is in the field of view of the lens. More particularly, as best illustrated in FIGS. 9 and 10, means are provided defining a pivot axis for each of such frames parallel the edge of it which is within the holder housing and along its front wall 55. Such means includes a pair of collars 56 respectively adjacent each end of such edge projecting to the side of the frame. As shown, a pivot pin 57 associated with each frame passes rotatably through the collars 56 and has its ends received within opposed track slots 58 at the corner edges of the holder housing for transverse movement of the same pin along the side walls of such housing. Spring means in the form of a double eliptical leaf spring 59 is positioned with its ends also within the opposed track slots at the housing corners to normally urge the pins toward the front wall 55 of the housing.

Because of the above construction, each of the frames 49 and its supported light modifying element is pivotal between the inactive position shown, for example, for the frame 49, in FIG. 9 to the position shown for such assembly in FIG. 10. When any one of the frames is in the position represented by the frame 49, the leaf spring 59 associated therewith will cooperate with the collar construction 56 on the frame to aid in maintaining such frame in the active position, as well as forward against the front wall 55 of the housing. Moreover, a coil spring 62 is provided circumscribing each of the pins 57 with one of its ends 63, for example, bearing against the interior side of the housing wall and its other end 64 bearing against the frame with which it is associated, to thereby urge the frame toward its active position whenever it has been released from its inactive position by the depression of the plunger 53.

It will be recognized that because of the above construction, the active position for all of the frames will be in the same plane against the front wall 61 of the holder housing. However, only one of such frames can occupy such location at any one time. As a particularly salient feature of the invention, however, the above construction enables all of the frames to be pivoted together into positions within the holder for protection when, for example, the holder is detached from the light shade. That is, when one of the frames is in the active position shown for frame 49, for example, because of the capability of the pivot pin moving within their track slot against the urging of the springs 59 associated therewith, the other pivot pins can be moved to locations further inwardly of the housing so that the frame associated therewith is pivotal into a position parallel to the active position within the holder. Such a positioning of a frame is shown for the frame 49″ in FIG. 10. It will be understood that the frame 49″ and the fourth frame not shown can also be moved upward as indicated by the arrow 66 so that they can be pivoted into the housing. The result is that rather than the frames projecting outward of the housing as illustrated in FIG. 6, they may be "stacked" within the holder for protection. Thus, whenever any particular support holder of the invention is detached from a light shade, the holder housing protects all of the frame and light modifying elements it provides.

It will be seen from the above that it is a simple matter to substitute one holder for another with any particular light shade to provide desired light modifying elements. Moreover, it will be appreciated that the depth of the light shade needed to provde, for example, the 1-to-1 ratio will depend upon the particular lens 12 which is being used with a camera. This construction enables any one of several different light shades to be combined as desired with any one of a plurality of support holders.

The means by which each of the support holders is securable to a light shade enables quick and simple securance and detachment as desired. To this end, the housing 51 of the support holder is provided with a ledge 67 which defines a square projection circumscribing the opening of such housing to be mated with the entrance opening of the light shade. As shown in FIG. 9, such ledge projections into the entrance opening and has on one side thereof (the right side as viewed in FIG. 9) an outwardly projecting tab 68 which sandwiches an inwardly projecting flange 69 on the light shade between it and the support housing. On the side of the flange opposite the tab 68, a releasable catch 71 is provided for gripping the flange 69 of the light shade on such side. The releasable catch is secured to the support holder via a wire spring 73 which projects lengthwise thereof and normally urges the same into the position shown in both FIGS. 9 and 10. Depression of the catch against the urging of the spring 73 will disengage the grip projection 74 on such catch from the flange 69 and thereby allow the holder to be detached from the light shade.

It should be noted that the flange 69 associated with the light shade extends around the full periphery of the entrance opening 47. The result is that the support holder is securable to such light shade at four different, 90° apart, relative orientations. This enables the masks of each holder to be oriented to provide differing positions of the areas of a film which are affected thereby, adding to the versatility of the arrangement.

The light shade is securable to the adapter 41 with the same type of releasable catch structure. Moreover, the auxiliary frame 46 is also securable thereto by such catch structure. Thus, such constructions will not be described in detail.

As previously mentioned, the apparatus as illustrated in FIGS. 6 through 10 is not only useful in the performance of the method of the invention, but also to position filters, vignetters, or other light modifying elements before the lens of a camera. As is known, a vignetter is a light modifying element which includes an area of a desired translucency and/or color to provide, for example, edge modification of a photograph.

Figure 11:
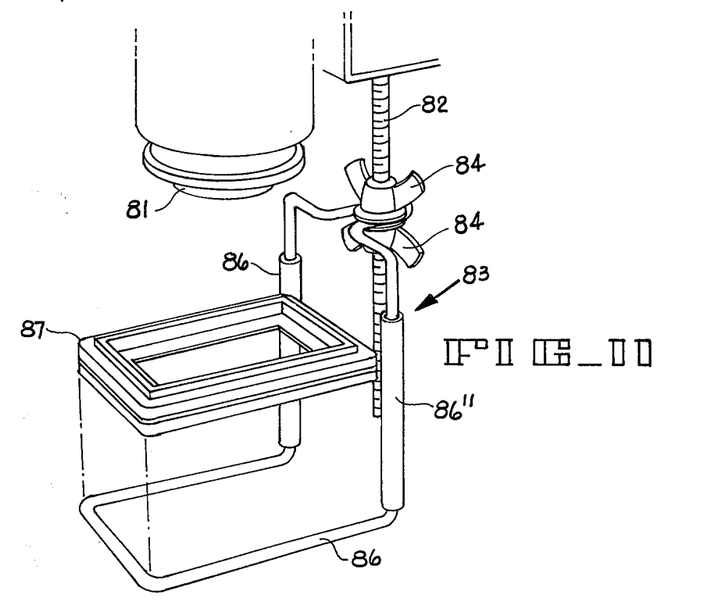
FIG. 11 illustrates an apparatus for adjustably supporting a frame for a light modifying element in front of the lens of, for example, a photographic enlarger.

FIG. 11 illustrates a structure which is particularly useful for positioning a vignetter, for example, in front of the lens 81 of a photograph enlarger. As shown, such apparatus includes a threaded rod 82 which projects from the enlarger parallel to the optical axis of the lens 81. A frame holder 83 is adjustably positionable along the rod 82 by varying the location therealong of the wing nuts 84 which support the same. The frame holder 83 includes a wire support 86 which projects transversely into a location in front of the lens 81. As shown, such wire holder supports a frame 87 for a vignetter, for example. The frame holder 83 is also adjustable along the optical axis of the lens 81 without the necessity of changing the location of the nuts 84. More particularly, the legs 86 of such holder which are parallel to the lens optical axis are of a telescopic construction providing such adjustment.

While the invention has been described in connection with preferred embodiments thereof, it will be recognized by those skilled in the art that various changes and modifications can be made without departing from its spirit. In this connection, wherever the term "camera lens" is used, the term is meant to include any device which provides an image of a subject on a plane. It is intended that the coverage afforded applicant be limited only by the spirit of the invention as defined by the claim language and its equivalents.

I claim:

1. Apparatus providing a plurality of light modifying elements for individual positioning in front of the light entrance lens of a camera comprising:
   a. a light shade;
   b. means for removably securing said light shade to said camera in front of said lens at a position in which all light passed into said camera by said lens first passes through an entrance opening of said light shade; and
   c. a support holder for said plurality of light modifying elements detachably secured to said light shade in front of said entrance opening, said support holder including for each of said light modifying elements:
      1. a frame for supporting same;
      2. means pivotally securing each of said frames to said holder for movement of said frame and the light modifying element supported thereby between an inactive position projecting outward of said holder into said light shade adjacent a side thereof and out of the field of view of said lens and an active position within said holder and in front of said entrance opening so that said light modifying element is in the field of view of said lens;
      3. all of said frames and light modifying elements supported thereby being pivotable into positions within said holder for protection thereby whenever said holder is detached from said light shade.

2. The apparatus of claim 1 further including a separate frame for supporting a light modifying element having means for detachably securing the same to said light shade in place of said support holder in front of said entrance opening with the light modifying element supported thereby in the field of view of said lens.

3. The apparatus of claim 1 wherein said means pivotally securing each of said frames to said holder for movement of said frame and the light modifying elements supported thereby between said inactive and active positions includes:
   a. means defining a pivot axis;
   b. spring means normally resiliently urging said axis means into a location providing said active position in the same plane for each of said frames and light modifying elements; and
   c. each of said axis means being movable against the urging of said spring to a second location providing pivotal movement of the frame and light modifying elements supported thereby into a position within said holder parallel to said active position to enable the positioning of all of said frames within said holder for protection at the same time.

4. The apparatus of claim 1 further including releasable means associated with said light shade for securing each of said frames in said inactive positions, and an actuator accessible from the exterior of said light shade for selectively causing said releasable means to release individually each of said frames.

5. The apparatus of claim 4 wherein said releasable means includes for each of said frames a magnet secured to either said light shade or said frame and magnetic material on the other of said light shade or frame for interaction with said magnet, and said actuator for causing release of said frame includes a plunger which upon depression from the exterior of said light shade engages said frame and separates said magnet and magnetic material from one another.

6. The apparatus of claim 1 wherein the light entrance opening of said light shade is generally of a square shape and said support holder includes a housing which is of a complementary square shape having one of said frames associated with each side thereof, which housing is securable to said light shade with each of said frames projecting through said light shade entrance opening adjacent a side thereof.

7. The apparatus of claim 6 further including means for detachably securing said support holder housing to said light shade comprising: a ledge defining a square projection on either said housing or the light shade holder circumscribing said entrance opening, which ledge fits within the other of said housing and light shade holder about said opening, and a releasable catch associated with said ledge for selectively gripping the other of said housing and light shade.

* * * * *